US007327238B2

(12) United States Patent
Bhogal et al.

(10) Patent No.: US 7,327,238 B2
(45) Date of Patent: Feb. 5, 2008

(54) METHOD, SYSTEM, AND COMPUTER PROGRAM PRODUCT FOR DETERMINING AND REPORTING TAILGATING INCIDENTS

(75) Inventors: Kulvir S. Bhogal, Fort Worth, TX (US); Gregory J. Boss, American Fork, UT (US); Rick A. Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 11/145,669

(22) Filed: Jun. 6, 2005

(65) Prior Publication Data

US 2006/0273922 A1 Dec. 7, 2006

(51) Int. Cl.
*B60Q 1/00* (2006.01)

(52) U.S. Cl. ....................... 340/436; 340/435; 340/901

(58) Field of Classification Search ................ 340/435, 340/436, 438, 901, 903; 701/93, 96, 301; 180/167, 169, 197; 434/29; 342/70
See application file for complete search history.

(56) References Cited

U.S. PATENT DOCUMENTS

| | | | | |
|---|---|---|---|---|
| 3,840,848 | A | 10/1974 | Marshall et al. | 340/38 P |
| 3,949,362 | A | 4/1976 | Doyle et al. | 340/104 |
| 4,600,913 | A | 7/1986 | Caine | 340/104 |
| 4,833,469 | A | 5/1989 | David | 340/901 |
| 5,066,950 | A | 11/1991 | Schweitzer et al. | 340/937 |
| 5,162,794 | A | 11/1992 | Seith | 340/903 |
| 5,166,681 | A | 11/1992 | Bottesch et al. | 340/933 |
| 5,357,438 | A * | 10/1994 | Davidian | 701/301 |
| 5,436,835 | A | 7/1995 | Emry | 364/426.01 |
| 5,760,708 | A | 6/1998 | Seith | 340/903 |
| 6,225,918 | B1 | 5/2001 | Kam | 340/903 |
| 6,233,515 | B1 | 5/2001 | Engelman et al. | 701/96 |
| 6,240,346 | B1 * | 5/2001 | Pignato | 701/35 |
| 6,345,228 | B1 | 2/2002 | Lees | 701/117 |
| 6,401,024 | B1 * | 6/2002 | Tange et al. | 701/96 |
| 6,498,620 | B2 | 12/2002 | Schofield et al. | 348/148 |
| 6,502,035 | B2 | 12/2002 | Levine | 701/301 |
| 6,597,981 | B2 * | 7/2003 | Nishira et al. | 701/96 |
| 6,630,888 | B2 | 10/2003 | Lang et al. | 340/815.45 |
| 6,690,268 | B2 | 2/2004 | Schofield et al. | 340/438 |
| 6,737,963 | B2 | 5/2004 | Gutta et al. | 340/435 |
| 7,133,661 | B2 * | 11/2006 | Hatae et al. | 455/404.1 |

* cited by examiner

*Primary Examiner*—Van T. Trieu
(74) *Attorney, Agent, or Firm*—Cantor Colburn LLP; Derek S. Jennings

(57) ABSTRACT

A method, system, and computer program product for detecting a tailgate event between two vehicles moving in a forward motion is provided. The two vehicles include a first and second vehicle, one of the two vehicles being an offending vehicle and the other of the two vehicles being an affected vehicle. The method includes determining a distance between the two vehicles. The first vehicle is ahead of the second vehicle. The method also includes calculating a safe distance range between the two vehicles based upon one or more of speed, weight, and safe braking range values of at least one of the two vehicles. The method further includes comparing the distance and the safe distance range and activating a recording device on the affected vehicle if the distance is less than the safe distance range indicating an unacceptable range value, the offending vehicle being responsible for causing the unacceptable range value.

7 Claims, 4 Drawing Sheets

METHOD, SYSTEM, AND COMPUTER PROGRAM PRODUCT FOR DETERMINING AND REPORTING TAILGATING INCIDENTS

BACKGROUND OF THE INVENTION

The present disclosure relates generally to vehicle safety systems and, in particular, to a method, system, and computer program product for determining and reporting tailgating incidents.

Tailgating is a problem for drivers, insurance companies, and society as a whole. Tailgate-related accidents are commonplace in today's hurried society and invariably result in substantial increases in insurance rates. Even a simple 'fender bender' can cost a vehicle owner (or the owner's insurer) hundreds, if not thousands, of dollars for parts and labor. Tailgating typically involves one vehicle traveling behind a second vehicle at a range and speed that is considered to be potentially harmful in that the reaction time of the second vehicle may be jeopardized should an unforeseen event cause the first vehicle to stop or decelerate in a sudden manner. For the affected driver, identifying a tailgating vehicle while driving is difficult, especially when the affected driver must focus on mitigating the dangerous situation. Providing a means to identify the tailgater and record his/her actions would be advantageous to the affected driver. In this manner, if an accident results from the tailgating, evidence will exist to aid the insurance company, police officer, and other relevant parties, thereby protecting the affected driver in the event of litigation.

This issue is further aggravated when considering that not all tailgate-related incidents are accidental. Various deliberately inflicted tailgate-related damages have been reported in an attempt to defraud insurers. This may be due, in part, to state laws which provide that in a rear end collision, the second vehicle operator is, by default, responsible for the accident, the rationale being that vehicle operators who maintain a safe distance behind the vehicle in front should be able to successfully avoid collision in an emergency situation.

In one such scheme, a staged rear-end accident involves a driver deliberately slamming on the brakes in order to cause a rear-end collision. Oftentimes, this driver not only collects insurance funds for damage to the vehicle, but also for purported bodily injuries as well. In addition, some of these drivers will then go to a remote location and cause further damage to the vehicle in order to maximize returns on the insurance claims.

Another type of scam involves waving or signaling to an innocent driver, prompting or inviting him/her to enter into traffic under the belief that the driver will yield. Once the innocent driver enters the traffic, the scam driver rear-ends him/her. While pursuing an insurance claim, the scam driver denies any such invitation to enter the traffic was extended, thereby implying that the innocent driver carelessly merged into oncoming traffic.

Tailgating, whether conducted as part of a scam or not, is dangerous and can cause serious risk of damage to vehicles and personal injury. The risk of injury/damage increases when factors such as the size and speed of a vehicle are considered, as well as any hazardous road conditions. While law enforcement agencies have adopted strategies for preventing tailgating (e.g., surveillance and citation of moving violations), such strategies are not adequate considering the ratio of traffic to enforcement personnel.

What is needed, therefore, is a way to identify tailgate incidents and report these incidents to relevant entities.

BRIEF SUMMARY OF THE INVENTION

Embodiments of the invention include a method for detecting a tailgate event between two vehicles moving in a forward motion. The two vehicles include a first and second vehicle, one of the two vehicles being an offending vehicle and the other of the two vehicles being an affected vehicle. The method includes determining a distance between the two vehicles. The first vehicle is ahead of the second vehicle. The method also includes calculating a safe distance range between the two vehicles based upon one or more of speed, weight, and safe braking range values of at least one of the two vehicles. The method further includes comparing the distance and the safe distance range and activating a recording device on the affected vehicle if the distance is less than the safe distance range indicating an unacceptable range value, the offending vehicle being responsible for causing the unacceptable range value.

Additional embodiments include a system for monitoring and detecting a tailgating event between two vehicles moving in a forward motion. The two vehicles include a first and second vehicle, one of the two vehicles being an offending vehicle and the other of the two vehicles being an affected vehicle. The system includes a range sensor operable for determining a distance between the two vehicles. The first vehicle is in front of the second vehicle. The system also includes a processor executing instructions for calculating a safe distance range between the two vehicles based upon at least one of speed, weight, and safe braking range values of at least one of the two vehicles; and comparing the distance and the safe distance range. The system further includes a recording device on the affected vehicle. Based upon the comparing, the recording device is activated if the distance is less than the safe distance range indicating an unacceptable distance range value, the offending vehicle being responsible for causing the unacceptable distance range value.

Additional embodiments include a computer program product for detecting a tailgate event between two vehicles moving in a forward motion. The two vehicles include a first and second vehicle, one of the two vehicles being an offending vehicle and the other of the two vehicles being an affected vehicle. The computer program product includes instructions for executing a method. The method includes determining a distance between the two vehicles. The first vehicle is ahead of the second vehicle. The method also includes calculating a safe distance range between the two vehicles based upon one or more of speed, weight, and safe braking range values of at least one of the two vehicles. The method further includes comparing the distance and the safe distance range and activating a recording device on the affected vehicle if the distance is less than the safe distance range indicating an unacceptable range value, the offending vehicle being responsible for causing the unacceptable range value.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter Which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

A vehicle safety system and method is described in accordance with exemplary embodiments. Vehicle safety system components installed on a vehicle monitor and detect occurrences of tailgating events. A tailgating event is triggered when an offending vehicle travels within a defined distance or range of the monitoring vehicle for a time period that meets or exceeds a specified time threshold. The defined distance or range (also referred to as "acceptable range" and "safe range") may be a variable that is calculated as a function of the speed of the monitoring vehicle and, when available, the weight of the monitoring vehicle and/or offending vehicle. A reasonable time threshold (e.g., three seconds), may be set by the vehicle operator in order to allow the operator of either vehicle to compensate for the actions of another (e.g., a lane change that places both vehicles in a single lane).

Figure 1:
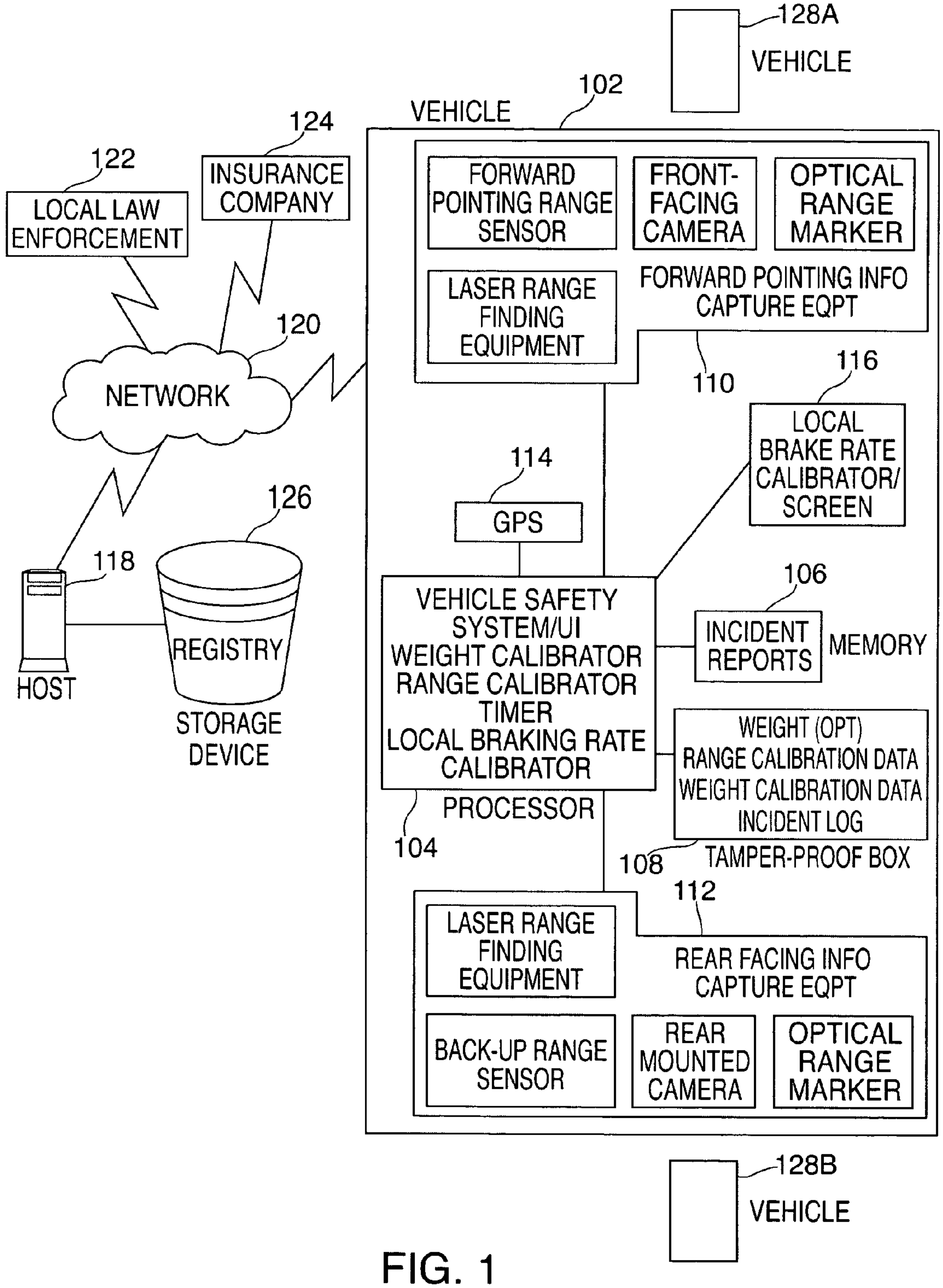
FIG. 1 is a block diagram of a system upon which the vehicle safety system may be implemented in exemplary embodiments.

Turning now to FIG. 1, a system upon which the vehicle safety system may be implemented in accordance with exemplary embodiments will now be described. The system of FIG. 1 includes a vehicle 102 (also referred to herein as "monitoring vehicle"). The vehicle 102 may be a passenger vehicle, commercial vehicle, motorcycle, or other similar type of vehicle. In exemplary embodiments, vehicle 102 is equipped with vehicle safety system components for implementing the monitoring and detection activities described herein. The vehicle safety system components may include a processor 104, memory 106, a tamper-proof box 108, information capture equipment 110, 112, a global positioning system (GPS) 114, and a local brake rate calibrator/screen 116.

Further included in the system of FIG. 1 are vehicles 128A and 128B (also referred to as "offending vehicles"). For purposes of illustration, vehicle 102 represents a transportation medium that is traveling in a forward motion on a public or private transportation corridor and is equipped with the vehicle safety system components in order to monitor traffic activities for detecting tailgating events. Likewise, vehicle 128A represents a transportation medium that is traveling in a forward motion and is in front of vehicle 102 (either directly within a common traffic lane or diagonally in a nearby traffic lane), while vehicle 128B is traveling in a forward motion and is behind vehicle 102 (either directly within a common traffic lane or diagonally in a nearby traffic lane). Vehicles 128A and/or 128B may or may not include vehicle safety system components. Additionally, while only three vehicles are shown, it will be understood that any number of vehicles may be present within the transportation corridor traveled by the vehicles 102, 128A and 128B in order to realize the advantages of the invention.

As indicated above, the vehicle safety system disposed within vehicle 102 enables individuals such as drivers to monitor and detect tailgating events. The vehicle safety system includes forwarding pointing information capture equipment (F-ICE) 110 and rear facing information capture equipment (R-ICE) 112. F-ICE 110 is implemented to identify and capture information relating to staged rear-end incidents. For example, vehicle 128A, which is ahead of, and in the same lane as, vehicle 102, quickly hits the brakes. Alternatively, vehicle 128A is diagonally in front of vehicle 102 and abruptly changes lanes to position itself directly in front of vehicle 102. R-ICE 112 is implemented to identify and capture information relating to tailgating incidents. For example, vehicle 128B is behind vehicle 102 and is traveling very close to, or otherwise at an unsafe distance from, vehicle 102. For ease of explanation, both types of incidents (i.e., staged rear-end incidents and tailgating incidents) will be referred to herein as tailgate events.

F-ICE 110 and R-ICE 112 each include a forward pointing range sensor and back-up range sensor (referred to collectively as "range sensors"), respectively. These range sensors detect objects that are present within a given distance or range of vehicle 102 and calculate the distance or range between the detected object and the vehicle 102. Objects of interest in facilitating the detection of tailgating events relate to other vehicles (e.g., vehicles 128A and 128B).

Ensuring reliability of the distance or range data acquired from range sensors is important as it may be subsequently needed as evidence in a police report, insurance claim, or legal suit. F-ICE 110 and R-ICE 112 may include laser range finding equipment that validate the range data acquired from the range sensors using laser technology. The laser range finding equipment may comprise, e.g., Newcon™ Laser Range Finder by Newcon Optik Ltd of Ontario, Canada. The laser range finder sends laser beam pulses to a target. Returned beams are captured by digital circuitry using a time differential that allows calculation of a distance to the target. In alternate exemplary embodiments, the distance or range data may be validated by optical range markers as described below. The laser range finding equipment may be validated or calibrated on a periodic basis or at will.

In exemplary embodiments, F-ICE 110 and R-ICE 112 also include a front-facing camera and rear-mounted camera, respectively. Front-facing camera and rear-mounted camera are positioned on vehicle 102 such that an optimal visual perspective of surrounding vehicles may be obtained with minimal or no obstruction. Front-facing camera and rear-mounted camera may comprise photographic equipment, video equipment, or other suitable visual information capture equipment as desired. These camera devices are used to record the activities of offending vehicles and may obtain relevant information such as license plate information as well as road and weather conditions.

Optical range marker devices may be associated with the cameras for providing distance markings superimposed on the camera images. Using the current speed of the vehicle 102 (e.g., via the speedometer which communicates the speed to the processor 104), optical range marker devices validate the distance or range between vehicle 102 and the tailgating vehicle.

In accordance with exemplary embodiments, the F-ICE 110 and R-ICE 112 are in communication with processor 104 and relay captured information to the processor 104 as will be described further herein. The processor 104 may include one or more applications for implementing the vehicle safety activities. These one or more applications are collectively referred to herein as vehicle safety system application. The vehicle safety system application may include a user interface for enabling a user to select preferences with respect to the type, extent, and manner of capturing information relating to traffic activities.

The processor 104 receives metrics from vehicle safety system components such as vehicle weight, range or distance values, and calibration data via the vehicle safety application. Additionally, user preference settings may be input via the user interface of the vehicle safety application. This collective information is processed by the vehicle safety application to determine the existence of a tailgating event.

Various levels of processing may be employed via the vehicle safety application. By way of generalization, acceptable distance metrics may be calculated using a basic algorithm that considers only the speed of the vehicles (e.g., for two vehicles (V1 in front and V2 trailing V1), if V1 is traveling at a speed of 30 MPH, a safe or acceptable distance between V1 and V2 is 90 feet. Alternately, the vehicle safety application is enabled to take advantage of additional metrics in order to achieve greater accuracy in calculating a safe distance or range. Other metrics include vehicle weight and safe braking rate (calculated using one or more of vehicle condition, road condition, and weather condition). For example, two vehicles (PV is a passenger vehicle and TT is a tractor trailer of a known weight) are traveling in a single lane at a speed of 30 MPH whereby PV is in front of TT. Clearly, the safe distance will be calculated at a higher range for TT than it would if the second vehicle was a passenger vehicle. The safe braking rate, as used in calculating acceptable range values, will be described further in FIG. 3. Additionally, it will be understood that a combination of these metrics may be used together in calculating acceptable distance range values.

Once a tailgating event has occurred, the vehicle safety application then generates an incident report for each occurrence and stores the incident report in memory 106, which is in communication with the processor 104. Incident reports may include any data that is useful in processing a police report, accident report, insurance claim, legal claim, or other type of event. For example, incident reports may include information such as recorded images/video, time of tailgate event, speed of vehicle, weight of vehicles, road and/or weather conditions, braking actions, steering maneuvers, airbag deployment, etc.

Tamper-proof box 108 may also be in communication with the processor 104 for receiving information generated as a result of the information processing described above. Other metrics may be stored in tamper-proof box 108 as well, such as steering maneuvers and braking actions that occur at the time of a tailgating event or an associated accident via e.g., air bag deployment. Additionally, an incident log of incident reports generated by the vehicle safety system application may be stored in tamper-proof box 108 as well. Tamper-proof box 108 is configured to ensure reliability and integrity of information captured (e.g., access to data restricted). To this end, calibration devices such as the laser range finding equipment may be stored in tamper-proof box 108 to prevent tampering.

Local brake rate calibrator/screen 116 enables an individual associated with vehicle 102 to determine a safe braking distance metric. This safe braking distance metric may be a variable that is dependent upon factors such as weather, vehicle weight, road conditions, etc. A screen may be provided within vehicle 102 for facilitating the calculation of this metric. This function is described in further detail in FIG. 3.

In accordance with exemplary embodiments, the system of FIG. 1 also includes a host system 118, local law enforcement entity 122, and insurance company 124, each of which may communicate with one another over one or more networks such as network 120. Host system 118 is in communication with a storage device 126. Network 120 may comprise any suitable communications network known in the art, such as a local area network, wide area network, Internet, etc. Host system 118 provides a means for individuals and entities (e.g., law enforcement, insurance companies, vehicle operators) to register for and implement the vehicle safety system as will be described further herein. Registry information may be stored in storage device 126.

Figure 2:
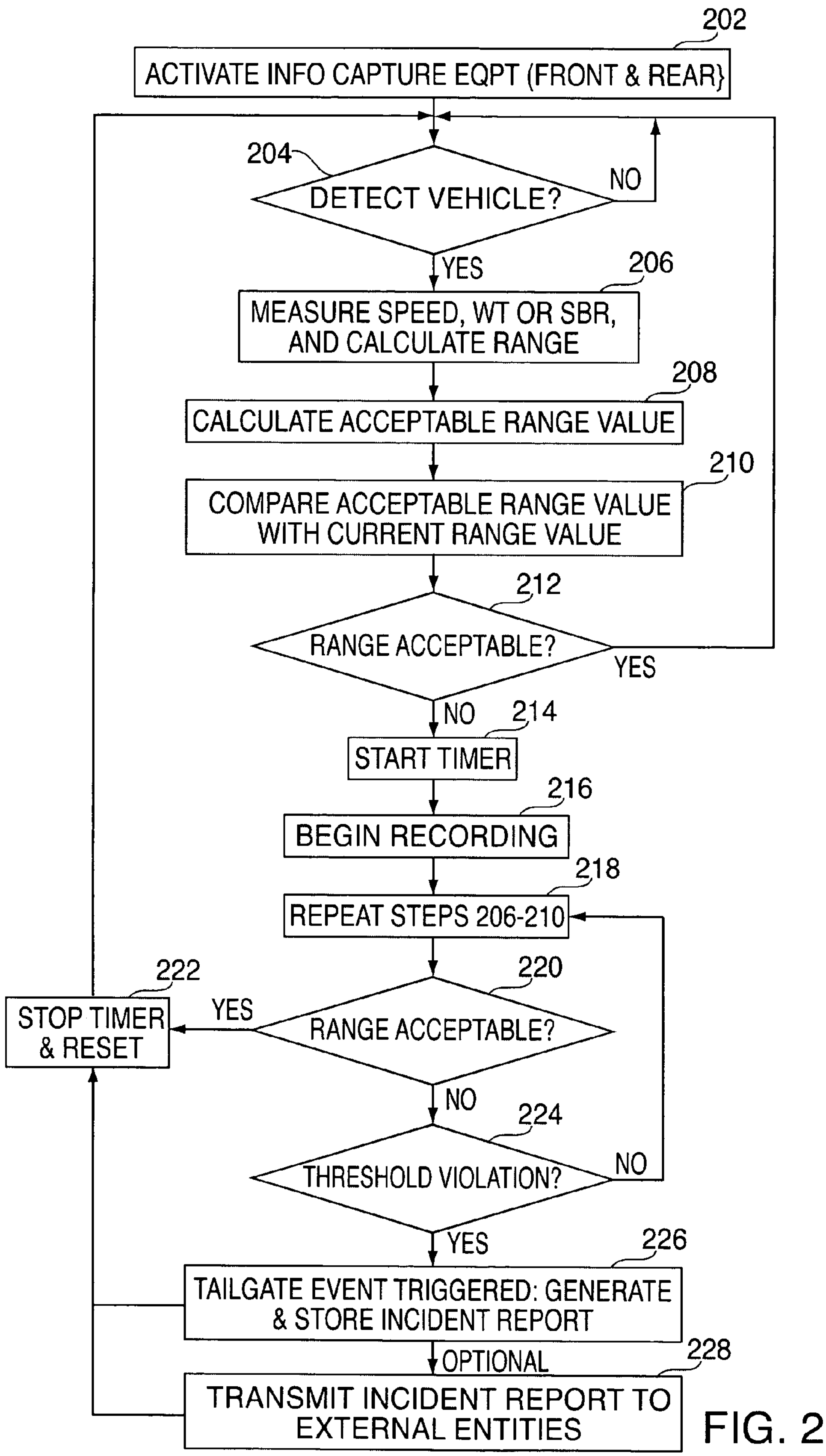
FIG. 2 is a flow diagram describing a process for monitoring vehicle activity and determining tailgate events in exemplary embodiments.

Turning now to FIG. 2, a flow diagram describing a process for identifying and reporting a safe distance violation (also referred to as tailgating event) in accordance with exemplary embodiments will now be described. F-ICE 110 and R-ICE 112 on vehicle 102 are activated at step 202. As the operator of vehicle 102 travels, the range sensors of F-ICE 110 and R-ICE 112 actively search for other vehicles within a specified range. At step 204, it is determined whether a vehicle has been detected by one or both of F-ICE 110 or R-ICE 112 via the range sensors.

If not, the process repeats whereby the F-ICE 110 and R-ICE 112 continue to search for vehicles. If the F-ICE 110 and/or R-ICE 112 detect a vehicle (e.g., 128A and/or 128B) at step 204, range sensors gather distance measurements from the detected vehicle at step 206. One or more additional measurements may be captured as well, such as weight or safe braking range. The distance between the two vehicles is calculated by the range sensors at step 206. At step 208, acceptable range values for these measurements are calculated via the vehicle safety application using the measured distance between the vehicles and other metrics such as vehicle speed, weight, or safe braking range.

The actual distance or current distance range value is compared with the acceptable range value at step 210. At step 212, it is determined whether the current distance range value is acceptable based upon the comparison. If so, this means that the two vehicles are currently at a safe distance from each other. The process returns to step 204 whereby the F-ICE 110 and R-ICE 112 continue to monitor and sense the presence of any vehicles.

If, on the other hand, the distance range value is not acceptable (i.e., the vehicles are too close together), the timer (timing device of processor 104) is started at step 214, and the cameras may initiate recording of the detected vehicle(s) at step 216. The F-ICE 110 and R-ICE 112 continue to track and capture the distance range information of the vehicle(s) and the vehicle safety application continues to process the captured information to determine acceptability as these values may change over time. As part of step 218, the current distance range and acceptable distance range values are calculated and compared as described above with respect to steps 206-210.

At step 220, it is determined whether the range is acceptable. If so, this means that the two vehicles are no longer at an unsafe distance from each other. The timer is stopped and reset at step 222 and the process returns to step 204. Otherwise, it is determined whether a threshold violation (i.e., a tailgating event) has occurred at step 224. As indicated above, a tailgate event occurs when the distance or range between vehicles is unacceptable for a predetermined time period (e.g., 3 seconds) as indicated by the timer.

If no violation has occurred, the process returns to step 218. Otherwise, an incident report is generated and stored at step 226. Optionally, the incident report may be transmitted to an external entity such as law enforcement entity 122 and/or insurance company 124 via network 120.

As described above, the vehicle safety application may utilize various metrics in determining acceptable distance or range values. Knowing the weight of one or both vehicles may provide greater accuracy in determining an acceptable distance range value. This weight information may be acquired by various means. For example, a passenger vehicle may have its weight programmed into the processor 104 at, e.g., at the time of manufacturing. The weight of a commercial vehicle, on the other hand, may vary over time depending upon its load. Thus, determining the weight of commercial vehicles may be accomplished by a means such as that described in FIG. 3. In an exemplary embodiment, the vehicles depicted in FIG. 3 are equipped with the vehicle safety system described in FIG. 1.

Figure 3:
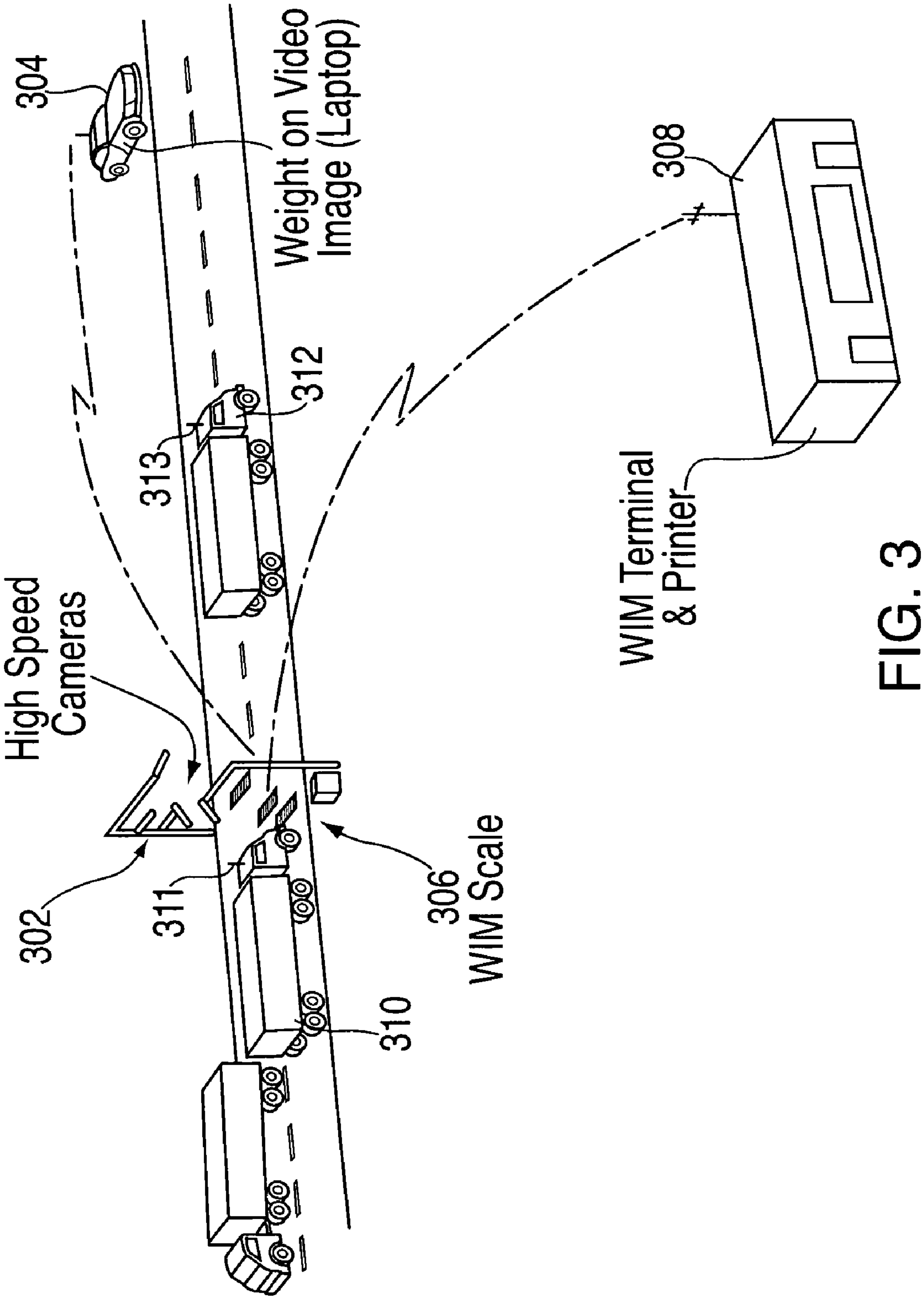
FIG. 3 is a diagram illustrating a process for determining vehicle weight and communicating that weight to external entities in exemplary embodiments.

As shown in FIG. 3, this weight information may be acquired via a weigh in motion (WIM) device 306 that is found on various highways. High-speed cameras 302 can be used to identify the vehicle (e.g., vehicle 310) for which the weight has been determined. The data from the cameras 302 and the weight information from WIM device 306 can be relayed to a monitoring vehicle (e.g., police vehicle 304), and optionally, a WIM terminal/printer at a facility 308 that is in range of the transmission. Once the weight of the vehicle 310 is determined, the weight data may be transmitted to the vehicle 310. Vehicle 310 may include a signaling device 311 for acquiring this weight information and may then continually transmit this weight information within a range. For example, signaling device 311 may comprise a laser device that transmits weight information via focused beam forward. Alternatively, signaling device 311 may comprise a transceiver that transmits weight information via over-the-air (OTA) radio frequency transmission. As shown in FIG. 3, another vehicle 312 also includes a signaling device 312 that may be the same or similar in function to the signaling device 311 of vehicle 310. When the other vehicle 312 (affected vehicle) detects that a rear vehicle (vehicle 310, or the offending vehicle) is coming within an unacceptable distance, it then activates its transceiver 313 to determine whether the rear vehicle 310 is transmitting its weight. If the rear vehicle 310 is transmitting its weight, that weight information is captured by vehicle 312 and is used by the vehicle equipment system in its calculations to determine a safe braking distance for the rear vehicle 310 and, ultimately, whether the vehicle 310 is tailgating. In addition to the weight information, other auxiliary information may be transmitted as well, such as the make and model of the vehicle, number of axels, number of attached trailers, etc, via, e.g., images captured from the cameras 302.

Figure 4:
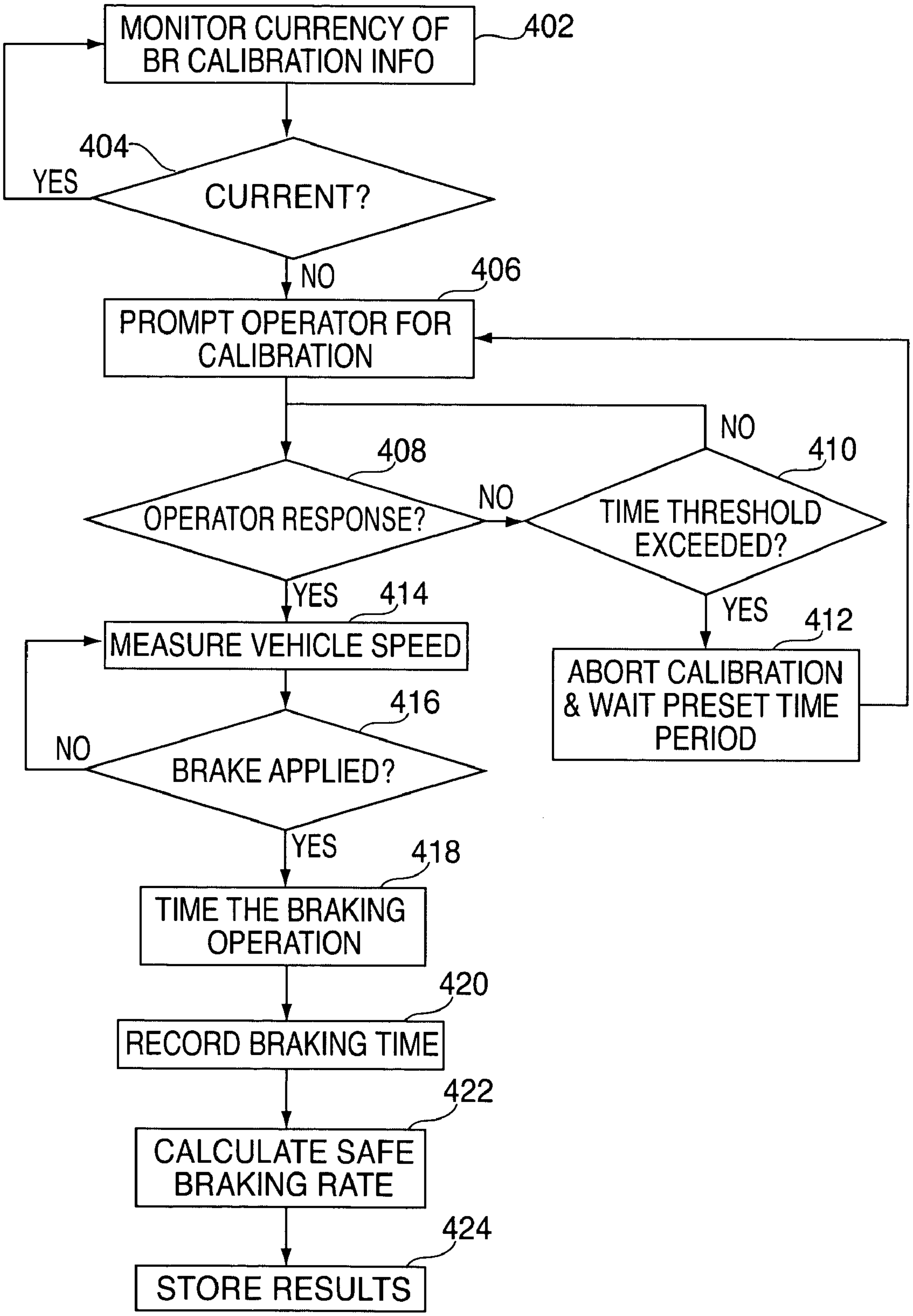
FIG. 4 is a flow diagram describing a process for determining a safe braking distance metric in exemplary embodiments.

In alternative embodiments, if the current weight of a vehicle is not known, the weight may be estimated via the make and model information of the vehicle (for passenger vehicles), by the number of axels on a semi truck, or other reasonable means of estimation. Alternatively, the vehicle safety application may enable a vehicle operator to derive a safe braking range, which can be used in lieu of this weight information as well as the acceptable range value. This may be accomplished via the local brake rate calibrator/screen 116 of vehicle 102. Turning now to FIG. 4, a process for determining a safe braking range in exemplary embodiments will now be described.

Safe braking range calibrations may be performed periodically or at will. At step 402, the vehicle safety application monitors the currency of existing calibration information. If it is current (e.g., calibration has been performed within a time period that is close to, or within reason of, the current time such that the existing safe braking range calculations are accurate given the vehicle condition, road conditions, weather conditions, etc.) at step 404, the currency of calibration information continues to be monitored (returning to step 402). Otherwise, the vehicle operator is prompted to initiate a safe braking range calibration at step 406. The operator may choose to forego this calibration if desired or necessary, whereby the process waits unsuccessfully for a response from the operator at step 408. The process may wait a pre-determined time period for a response and if this time period is exceeded at step 410, the calibration operation is aborted at step 412 and the process returns to step 406 after a preset waiting period. If the time period has not been exceeded at step 410, the process continues to wait for a response at step 408.

If the operator responds affirmatively at step 408, the process measures the vehicle speed via, e.g., the speedometer reading at step 414 and waits for the operator to apply the brakes at step 416. If the brake is not applied, the process returns to step 414 where the vehicle speed continues to be measured. If the brake has been applied at step 416, the process times the braking operation from the instant of brake application to the time the vehicle speedometer reaches 0 MPH at step 418. The braking operation time is recorded at step 420. The braking operation may be impacted by the condition of the vehicle (e.g., balding tires, worn brake pads), weather conditions (e.g., reduced visibility), and/or road conditions (e.g., road construction, pot holes, slippery roads). These conditions may be factored into the braking operation time, and thus, the safe braking range calculation, which is derived in step 422. The safe braking range is then stored in memory and/or tamper-proof box 108 for use in determining the occurrence of a tailgate event as described in FIG. 2.

As indicated above, the vehicle safety system and method includes components installed on a vehicle for monitoring and detecting occurrences of tailgating events. The tailgating event data may be stored internally on the monitoring vehicle and may also be relayed to external sources such as insurers, law enforcement, and other relevant entities.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for monitoring and detecting a tailgate event between two vehicles moving in a forward motion, the two vehicles comprising a first vehicle and a second vehicle, one of the two vehicles being an offending vehicle and the other of the two vehicles being an affected vehicle, the method comprising:

determining a distance between the two vehicles, the first vehicle in front of the second vehicle;

calculating a safe distance range between the two vehicles based upon at least one of speed, weight, and safe braking range values of at least one of the two vehicles;

comparing the distance and the safe distance range;

based upon the comparing, activating a recording device on the affected vehicle if the distance is less than the safe distance range indicating an unacceptable distance range value, the offending vehicle being responsible for causing the unacceptable distance range value;

wherein the weight is obtained via at least one of:

a memory device that stores the pre-programmed weight;

a user input via a weight calibration device;

a weigh in motion scale on a roadway, the weight transmitted from the weigh in motion scale to the weighed vehicle over a network via at least one of a monitoring vehicle and a weigh in motion terminal within transmission range of the weighed vehicle, wherein the weighed vehicle is the offending vehicle; and an estimated calculation based upon at least one of a vehicle make and model, a number of attached trailers, and a number of axels, wherein the vehicle make and model, the number of attached trailers, and the number of axels are captured by a camera near the roadway and transmitted over a network to the offending vehicle.

2. The method of claim 1, further comprising:

based upon the comparing, activating a timer device on the affected vehicle if the distance is less than the safe distance range;

recalculating the distance and the safe distance range;

comparing the recalculated distance and safe distance range and generating an incident report if the recalculated distance is less than the recalculated safe distance value for a specified time period measured by the timer, the incident report including results of the recording.

3. The method of claim 2, wherein the incident report further includes at least one of:

a license number of the offending vehicle;

a speed of the affected vehicle;

safe braking range of the affected vehicle;

weight of at least one of the affected vehicle and the offending vehicle;

steering maneuvers of the affected vehicle;

braking operation of the affected vehicle; and air bag deployment status of the affected vehicle.

4. The method of claim 2, further comprising transmitting the incident report to at least one of:

a law enforcement entity;

an insurance company; and a registry service or host system.

5. The method of claim 1, wherein the determining a distance between the first vehicle and the second vehicle further includes validating the distance using at least one of:

a laser range finding device; and optical range marker.

6. The method of claim 1, wherein the determining a distance between the first vehicle and the second vehicle is performed by at least one of a front facing range sensor and a rear-mounted range sensor affixed to the affected vehicle.

7. The method of claim 1, wherein the weighed vehicle transmits the weight via a transceiver, and wherein further, responsive to receiving the weight at the affected vehicle and determining a distance between the vehicles, the affected vehicle uses the weight to calculate a safe braking distance.

* * * * *